United States Patent [19]

Long, Jr.

[11] 4,373,261

[45] Feb. 15, 1983

[54] METHOD AND APPARATUS FOR MANUFACTURING ELECTRICAL HARNESSES

[75] Inventor: Alden O. Long, Jr., Carlisle, Pa.

[73] Assignee: AMP Incorporated, Harrisburg, Pa.

[21] Appl. No.: 183,861

[22] Filed: Sep. 4, 1980

[51] Int. Cl.³ ........................ H01R 43/04; B23P 19/00

[52] U.S. Cl. ........................................ 29/861; 29/749; 29/564.6

[58] Field of Search ................. 29/747, 749, 751, 857, 29/861, 564.6

[56] References Cited

U.S. PATENT DOCUMENTS

| | | | |
|---|---|---|---|
| 4,043,017 | 8/1977 | Folk et al. . | |
| 4,043,034 | 8/1977 | Sucheski et al. . | |
| 4,126,935 | 11/1978 | Rhines et al. | 29/749 X |
| 4,210,999 | 7/1980 | Smith | 29/857 |
| 4,235,015 | 11/1980 | Funcik et al. . | |

*Primary Examiner*—Francis S. Husar
*Assistant Examiner*—Carl J. Arbes
*Attorney, Agent, or Firm*—Frederick W. Raring

[57] ABSTRACT

Apparatus for connecting individual wires to contact terminals contained in an insulating connector housing has a first wire insertion zone in which there is located a connector locator. The individual wires are fed from reels to the wire insertion zone and the ends of the wires are inserted into the terminals by individual inserters. The connector is thereafter moved away from the insertion zone and wire is withdrawn from the spools or reels. During movement of the connector, the wires are cut to produce a harness assembly. The apparatus also has a second insertion zone and a second connector locator therein. The apparatus can be operated in a mode such that a second connector is applied to the harness wires after the first connector has been moved away from the first insertion zone.

13 Claims, 20 Drawing Figures

32
184
174
176
188
172
186
168
170
178
182
180
166
170
170

FIG. 13
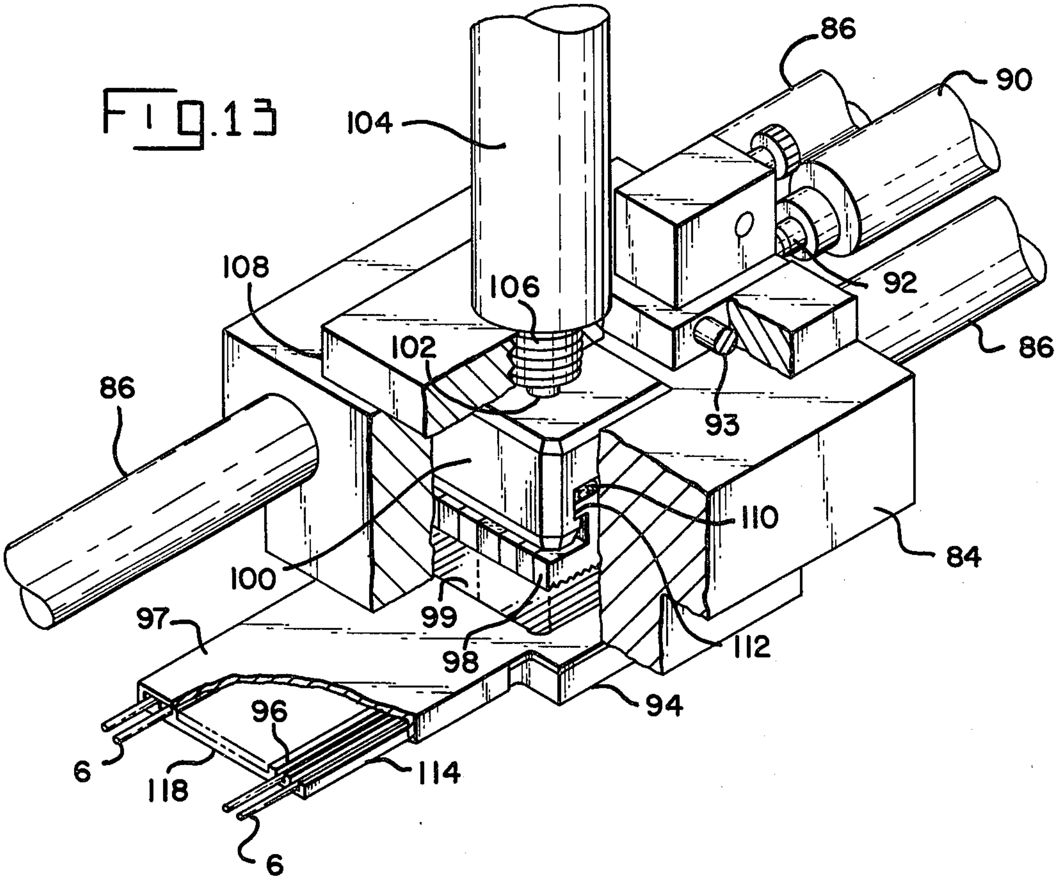
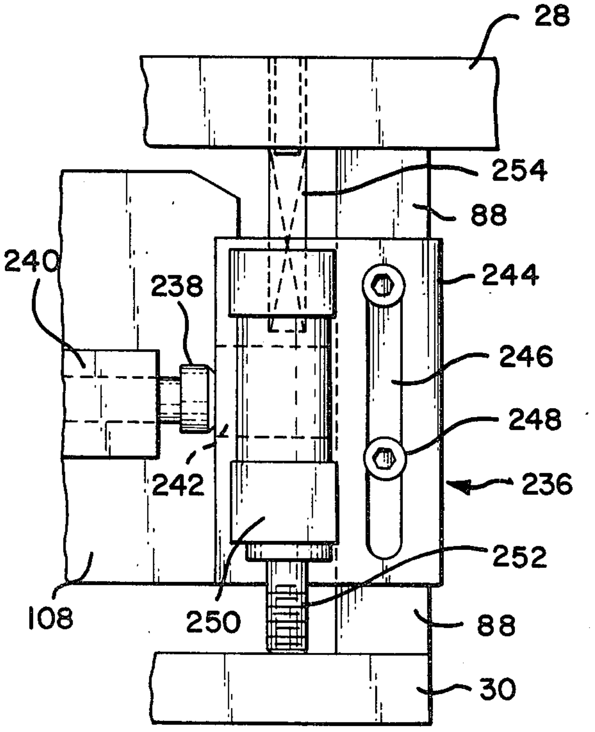
FIG. 15
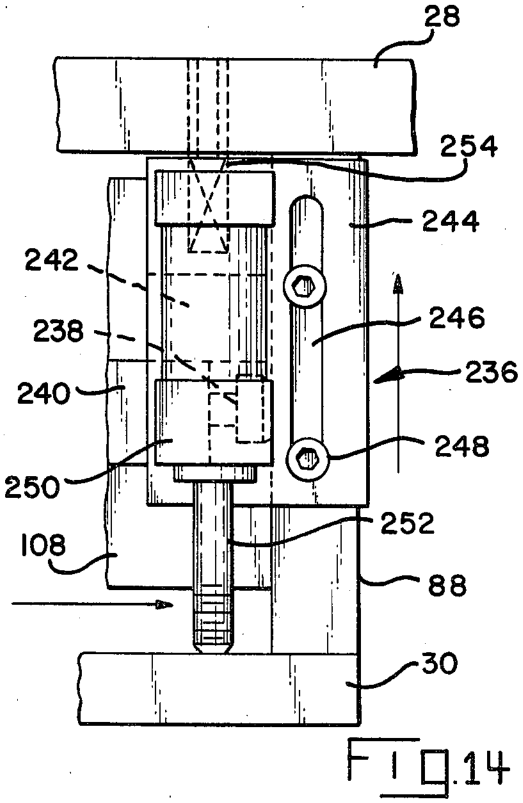
FIG. 14

METHOD AND APPARATUS FOR MANUFACTURING ELECTRICAL HARNESSES

FIELD OF THE INVENTION

This invention relates to machines and methods for producing electrical harnesses and harness subassemblies of the type comprising at least one electrical connector having wires secured to the terminals in the connector and extending from the connector.

BACKGROUND OF THE INVENTION

It is now common practice in the electrical industry to produce electrical harnesses and harness subassemblies by means of semi-automatic or fully automatic machines of the type having locating means for locating a connector in an insertion zone, wire feeding means for delivering wires extending from reels or the like to the insertion zone, and insertion punches for pushing the wires into the wire-receiving portions of terminals contained in a connector housing. The resulting harnesses or harness subassemblies will thus consist of one or more multi-contact electrical connectors and wires extending from the terminals in the connectors. One type of harness subassembly commonly produced by known machines comprises a single connector having wires extending from the terminals with the wires being of varying lengths, if desired, and having the insulation stripped from their free ends. Another type of harness which is produced with presently available machines comprises two connectors with wires extending between the terminals in the connectors. It would be desirable also to produce harnesses of the type having two or more electrical connectors and wires extending between the two connectors and beyond one of the connectors with the free ends of the wires stripped of insulation. Most of the presently available harness making machines of the type under consideration here are incapable of producing the third type of harness described above.

The available harness making machine which are presently being used are, in general, proving to be satisfactory, although they do not fill all of the requirements of the industry. Particularly, presently available machines tend to lack versatility in that they are capable of producing only one of the three types of harnesses described above. Those machines which are capable of producing more than one type of harness require a substantial amount of adjustment and tooling changes when it is necessary to change the type of harness being produced. Finally, the presently available machines are relatively large and complex and their use can be justified on economic grounds only where a very high volume of production can be maintained for a protracted time period.

The present invention is directed to the achievement of a simplified and compact harness making apparatus which has moreover a high degree of versatility in that it is capable of producing any of the three types of harnesses described above. The invention is further directed to the achievement of a machine which can be operated in any of its operating modes without the necessity of substantial adjustments or tooling changes in the machine.

A machine in accordance with the invention comprises a first wire insertion zone having a connector locating means therein for locating a first connector in the zone. Wire feeding means are provided for feeding wires in side-by-side parallel relationship to the insertion zone along a first wire feed path. Wire insertion punches are provided which move along a second path towards the connector in the connector locating means thereby to insert the wires into the terminals in the connector in the first insertion zone. After insertion, the connector is moved by a connector moving means along a continuation of the first path so that as the connector moves away from the insertion zone, wire is drawn or pulled from the reels. During such movement of the connector, the individual wires are cut by wire cutting blades which are located along the first wire feed path and between the insertion zone and the reels of wire. The wires are cut individually and a separate set of cutters are provided for each wire so that varying wire lengths can be obtained in the finished harness by actuating the individual cutters at different time intervals after commencement of movement of the connector.

As described above, an apparatus in accordance with the invention thus produces a simple harness subassembly of the type comprising one connector with individual wires of varying lengths extending from the terminals in the connector. When it is desired to produce a harness subassembly of the type comprising two connectors with wires extending between the terminals in the two connectors, a connector is placed in a second wire insertion zone and after movement of the first connector away from the first wire insertion zone, movement of the first connector is stopped and the wires are cut and inserted into the terminals in the second insertion zone. To produce a harness subassembly of the third type described above, comprising two connectors, wires extending between the terminals in the two connectors, and wires extending beyond one of the two connectors, the final wire cutting operation is again carried out while the partially completed harness subassembly of two connectors is being moved away from the wire insertion zones.

The invention embraces both apparatus and method aspects and while a specific embodiment of an apparatus in accordance with the invention is described below, it will be appreciated that the method of the invention may be practiced with apparatus other than the one described below.

DESCRIPTION OF THE DRAWINGS

FIG. 13 is a perspective view on an enlarged scale of the reciprocable wire feeding means for feeding wires from the reels to the insertion zone.

FIG. 14 is a view taken along the lines 14—14 of FIG. 2 showing details of a selective stop for the wire feeding means.

FIG. 15 is a view similar to FIG. 14 showing the positions of the stop for an alternative operating mode.

PRACTICE OF THE INVENTION

Figure 18:
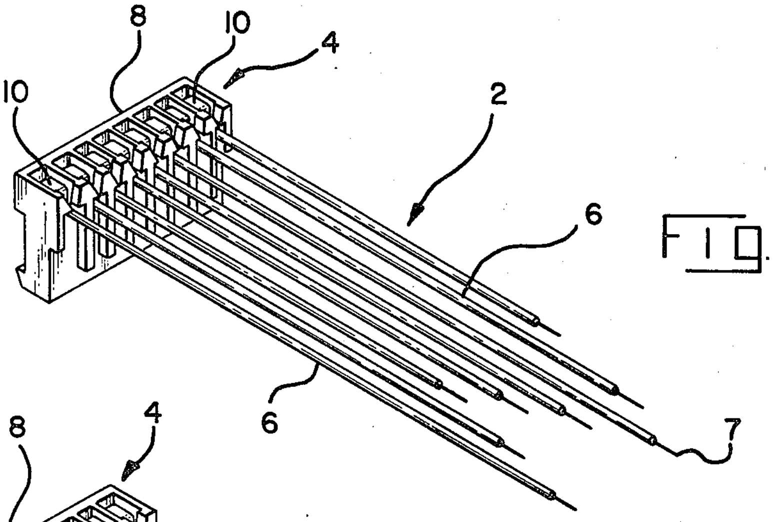
FIGS. 18, 19, and 20 are perspective views of different types of harnesses or harness subassemblies which are produced by the practice of the invention.
Figure 19:
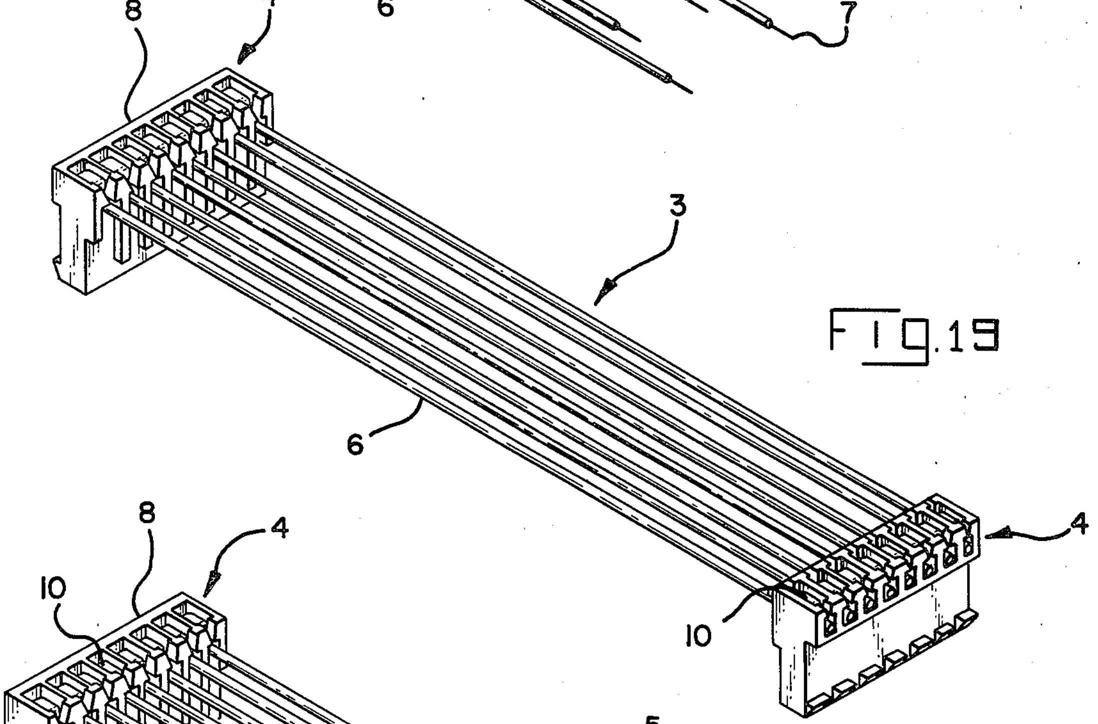
Figure 20:
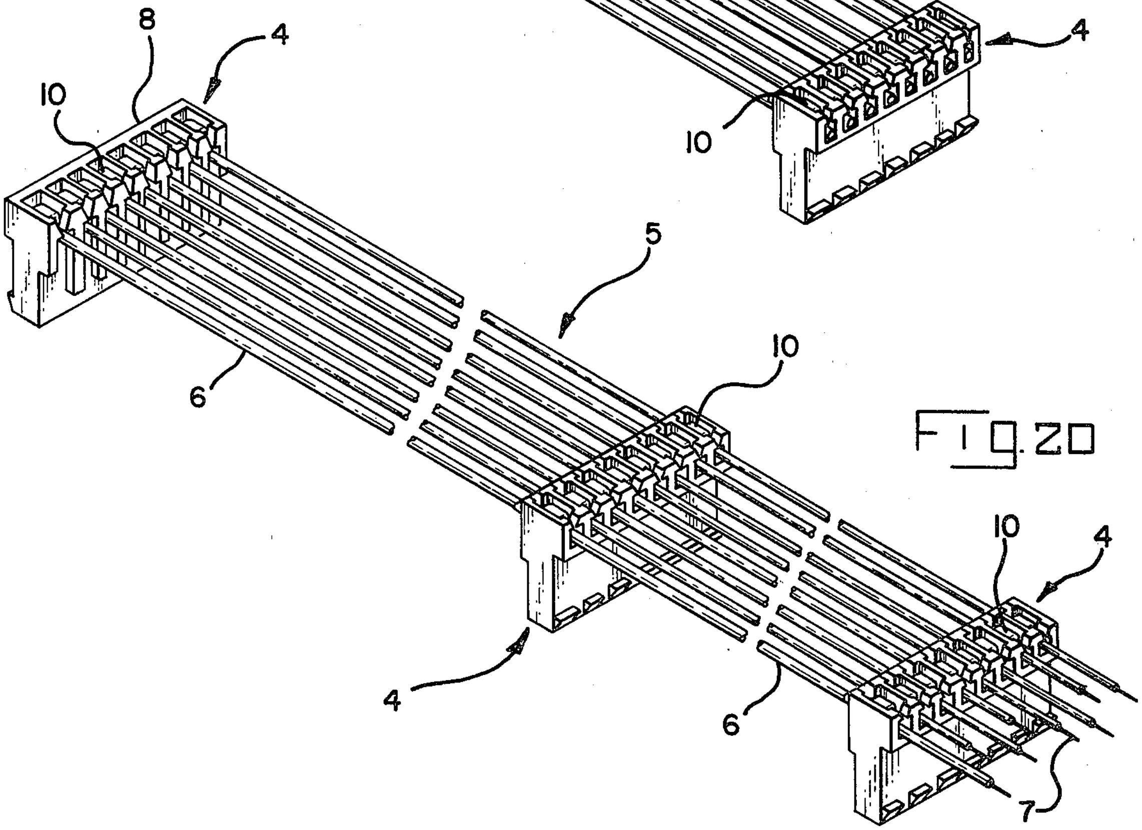

FIGS. 18–20 show the various types of harnesses or harness subassemblies which can be produced by the practice of the invention. The manufacture of harnesses as shown at 3 and 5, FIGS. 19 and 20, requires the operation of parts of the apparatus which are not required to produce a harness shown at 2 in FIG. 18. The invention will first be described with reference to the production of harnesses of the type shown at 2 and the parts of the apparatus and the method steps required for the production of harnesses of the types shown at 3 and 5 will subsequently be described.

The harness or harness subassembly 2 comprises a suitable electrical connector 4 having an insulating housing which contains a plurality of terminals 10. The terminals are of the type which are adapted to receive wires 6 upon movement of the wires laterally of their axes and into the wire receiving portions of the terminals, these wire receiving portions being adjacent to the upper end 8 of the connector. The wires 6 are of varying lengths as shown, and have the insulation stripped from their free ends, as shown at 7.

Figure 1:
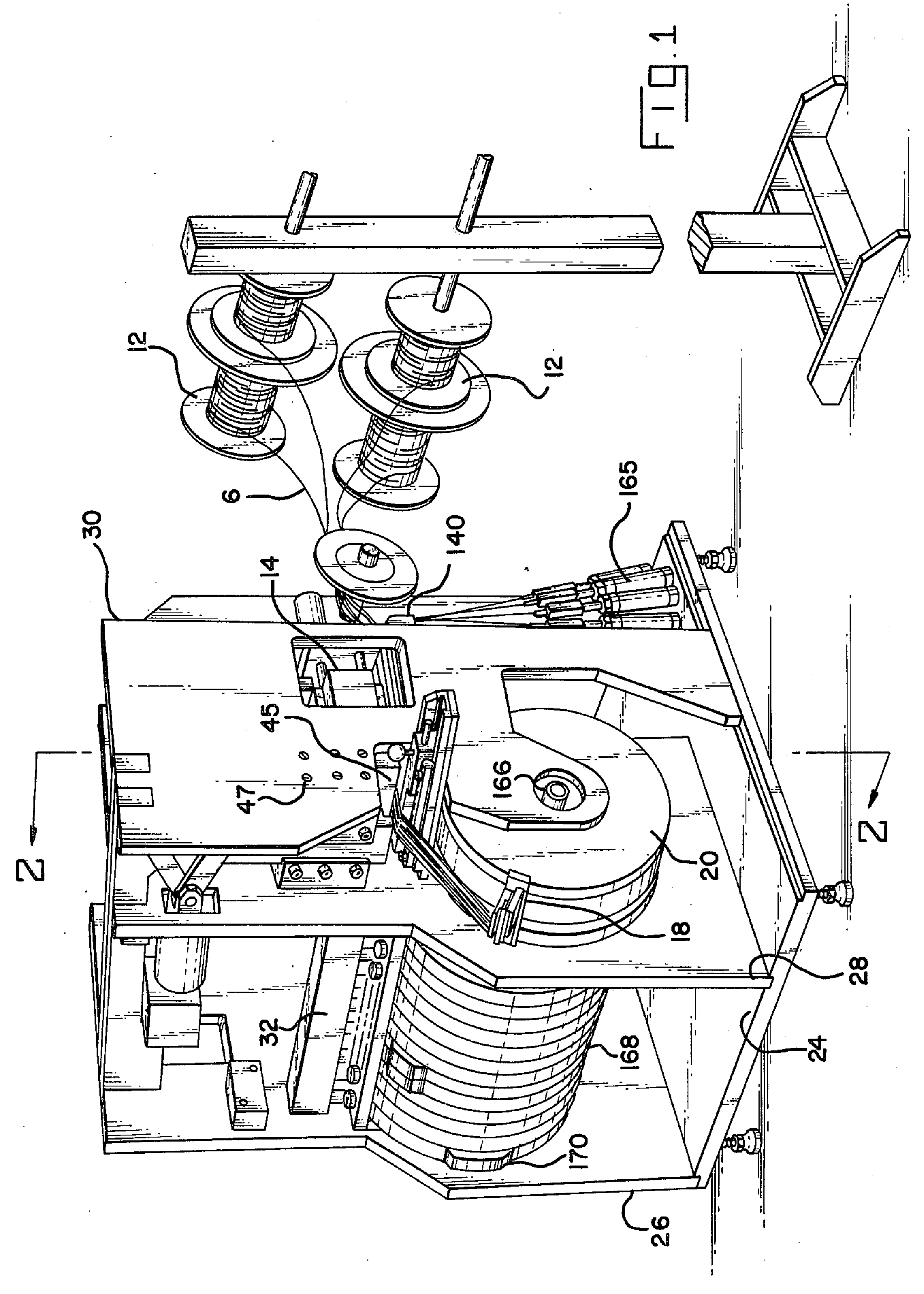
FIG. 1 is a perspective overall view of an apparatus in accordance with the invention.
Figure 2:
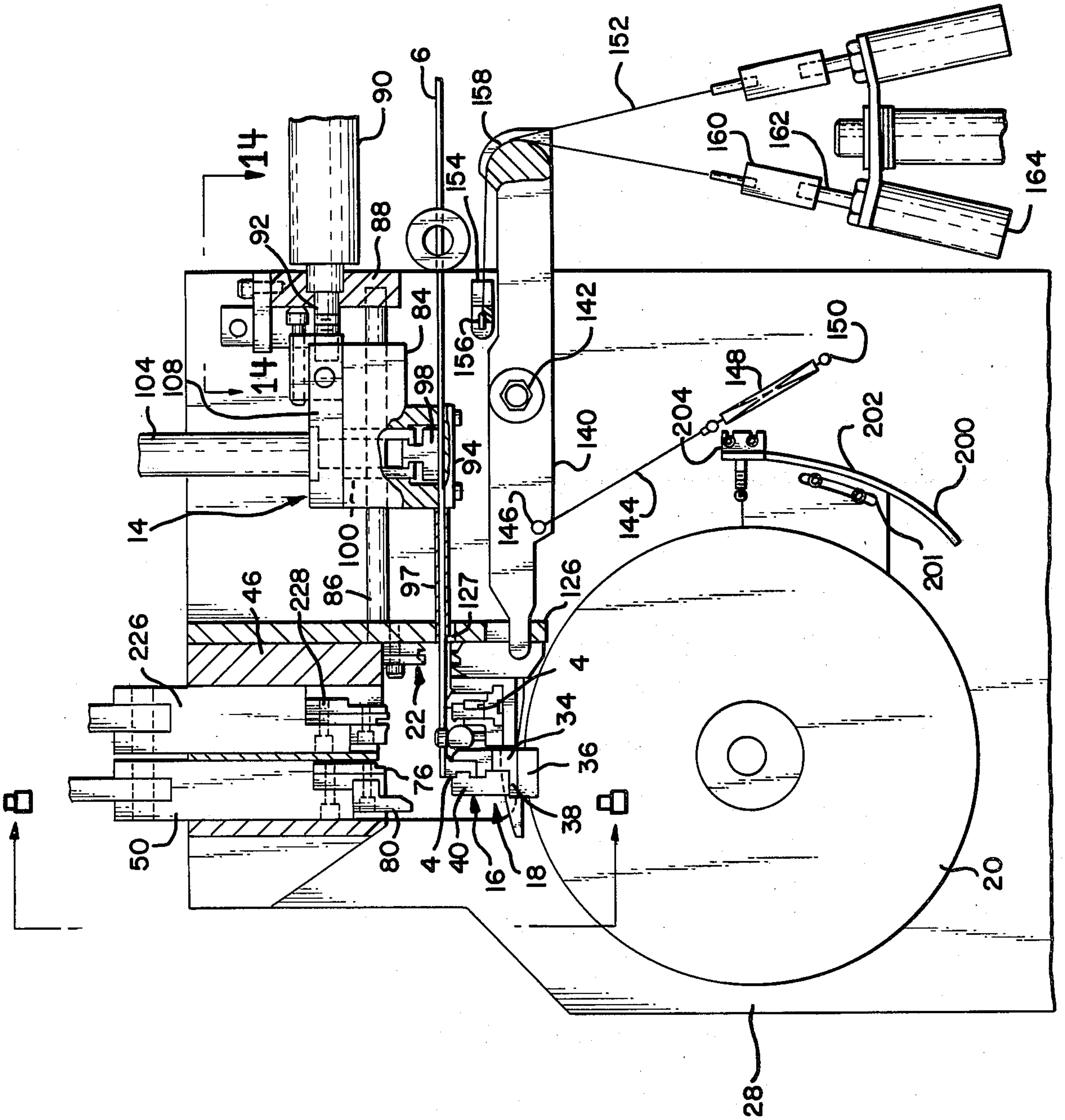
FIG. 2 is a sectional side view looking generally in the direction of the arrows 2—2 of FIG. 1, this view showing the position of the parts at the beginning of an operating cycle and prior to insertion of wires into a first connector located in the first insertion zone.

The principles of the apparatus can be understood from a brief inspection of FIGS. 1 and 2, which show all of the essential parts of the apparatus. The wires 6 are fed from reels 12 mounted on a suitable stand or support, the number of reels being equal to the number of wires extending from the connector 4. The wires are fed by a wire feeding means 14 to a wire insertion zone generally indicated at 16, FIG. 1, which has a connector locating means 18 therein and locating a connector in alignment with insertion punches which will be described below. This locating means 18 is mounted on the rim of a wheel 20 which is capable of oscillation through an angle of about 270 degrees. After the wires have been inserted into the terminals in the connector, the wheel is rotated in a counter-clockwise direction from the position shown in FIG. 2 to move the connector with the wires attached thereto, along a circular path and thereby draw wire from the reels 12. During movement of the connector, the individual wires are cut by wire cutting means 22. As explained below, a separate cutting means is provided for each wire and these separate cutting means can be actuated at any desired time during rotation of the wheel 20, so that wires 6 of varying lengths result.

The connector 4 may be of any desired type, the particular connector shown being described in detail in U.S. Pat. No. 4,159,158 issued Jan. 26, 1979.

The apparatus is mounted on a frame comprising primarily of a horizontal base plate 24 and three spaced-apart vertical plates 26, 28, and 30. A transverse support member 32 extends between the plates 26, 28 and additional transverse supports extend between the vertical plates, as will be subsequently described.

Figure 7:
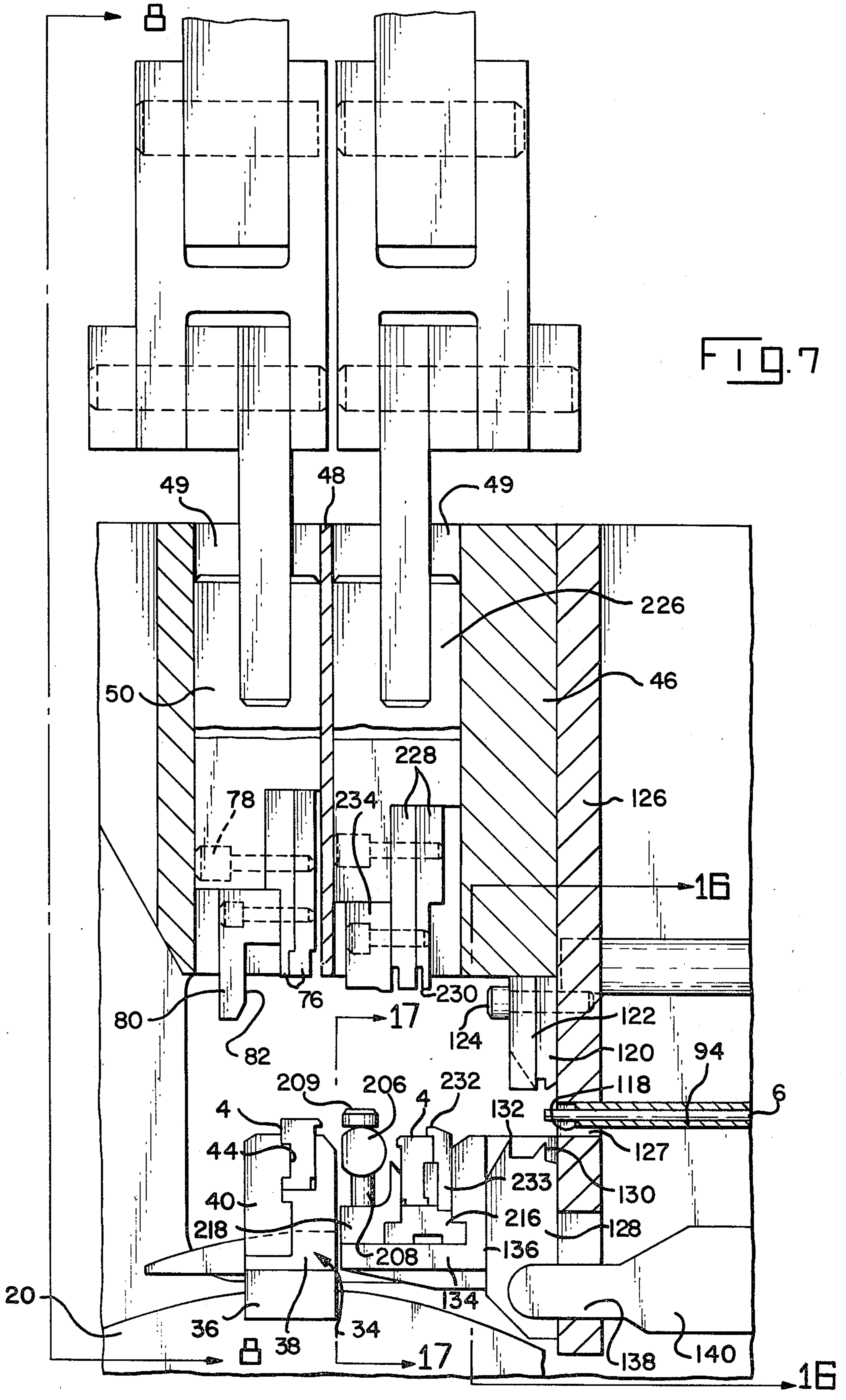
FIG. 7 is a sectional side view on an enlarged scale of the operating zone of the apparatus including the first and second insertion zones and showing the cutting means for cutting the wires, this view being taken along the section lines 7—7 of FIG. 8.

A connector locating means, for locating a first connector 4 in the insertion zone, comprises a generally L-shaped block 34, FIG. 7, which has a base portion 36 secured in the rim of the wheel 20. A front plate 40 is mounted against the upstanding arm 38 of the block 34 and the opposed surfaces of this arm 38 and the plate 40 define a recess or cavity 44 which conforms to the profile of the connector 4 so that the connector can be simply slid into this cavity. The front plate 40 is held to be block 38 by suitable fasteners as indicated at 42, FIG. 8. It will be noted that the vertical plate 30 has a gap 45 therein on its left hand edge, as viewed in FIG. 1, to permit access to the connector locating means in the insertion zone.

Figure 10:
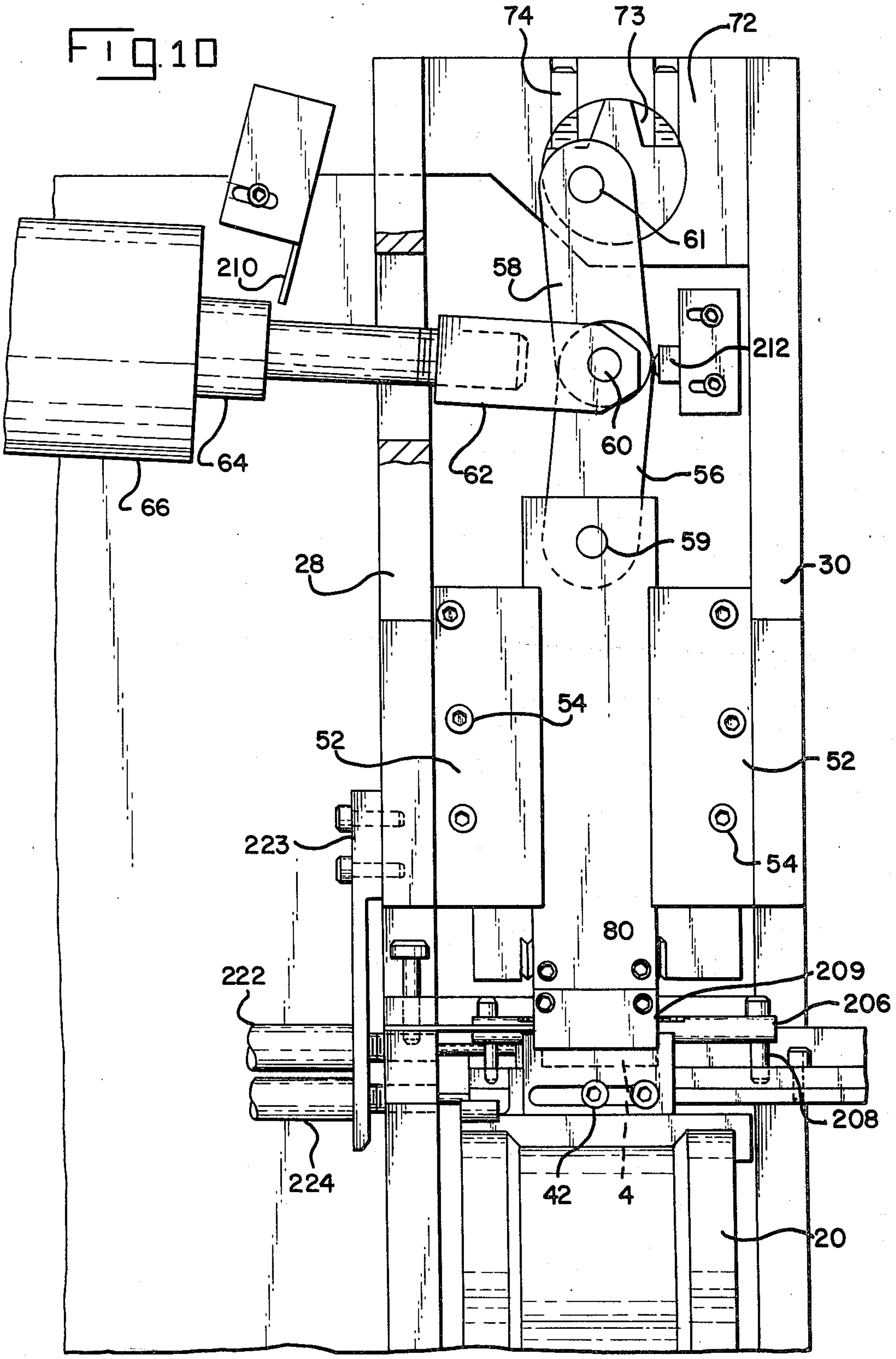
FIG. 10 is a view similar to FIG. 8 showing the positions of the parts at the instant of insertion.

The reciprocable portions of the apparatus which insert the wires into the connector are mounted in a press frame block 46, FIG. 7, which is between the plates 28, 30 and above the gap 45, this block being held in position by suitable fasteners, as indicated at 47. The block 46 has a vertically extending opening 49 extending therethrough, which is divided into two passageways by a central wearplate or divider 48. This divider thus defines two passageways for two rams 50 and 226. The ram 50 is confined by ram guides or gibs 52 secured by fasteners 54 to the face of the block 46. The ram 50 is reciprocated by a toggle mechanism comprising links 56, 58, FIG. 8, and a piston rod 64. The link 56 is pivotally connected at 59 to the upper end of the ram 50 and the link 58 is pivoted at 61 to an eccentrically adjusted block 70 in a frame block 72. The overlapping ends of the links 56, 58 are pivoted at 60 to a yoke 62 on the end of the piston rod 64 which extends from a piston cylinder 66. It will be apparent that upon pressurization of the piston cylinder 66, piston rod 64 will move rightwardly from the position of FIG. 8 to straighten the toggle mechanism, as shown in FIG. 10, thereby driving the ram 50 downwardly. The stroke of the ram can be adjusted within precise limits by means of set screws 74 which extend into recesses 73 in the eccentric block 70 and bear against the surfaces of these recesses.

The leading ends of the wires 6, which are shown as positioned above the connector 4, are inserted into the terminals in the connector by insertion punches generally indicated at 76, FIG. 7. In the embodiment shown, these punches 76 are shown as formed on two separate tooling blocks and are secured to the lower end of the ram 50 by suitable fastening means 78. It will be understood that the precise nature of the punches and their shape will depend upon the precise type of terminal contained in the connector 4.

In order to ensure that the connector 4 in the cavity 44 is precisely aligned with the punches, an L-shaped supporting and aligning block 80 is also mounted on the lower end of the ram. The depending arm of this block 80 has an inwardly directed surface 82, FIG. 7, which moves over the leftwardly facing surface of the front plate 40 as the ram moves downwardly. This block 80 thus ensures that the connector locating means is precisely positioned so that the punches will be in alignment with the wires in the insertion zone. If the wheel 20, for example, is not properly positioned but is rotated, by a very slight amount, in a counter-clockwise direction from its proper position, the surface 82 will move over the block 30 and rotate the wheel through a very slight clockwise arc.

The wire feeding means generally located at 14 in FIG. 2, comprises a reciprocable block 84, FIG. 13, which is slideably mounted on spaced-apart rails 86 which extend between the press frame block 46 in a suitable plate 88 at the right hand end of the apparatus. Block 84 is reciprocated by a piston cylinder 90 having a piston rod 92 which is connected to the block 84 by a suitable clevice type arrangement, as shown at 93. A wire guide assembly is secured to the downwardly facing surface of the block 84 and comprises wire support plate 94 having spaced-apart parallel grooves in its upper surface 96 and a cover plate 97 for the plate 94. The cover plate 97 is provided with a central opening 99 above which there are located side-by-side individual wire clamping bars 98, each of which is aligned with a wire in one of the grooves 96. These individual clamps 98 can be moved downwardly from their raised position, as shown in FIG. 13, by a pressure plate 100 to which the end of a piston rod 102 is connected. The piston rod extends from a piston cylinder 104 which is mounted in a fixed plate 108 by means of a mounting collar 106. The pressure plate 100 and the individual clamps 98 are contained in a central opening in the block 84 with the clamps and the plate being slideable downwardly from the position shown in FIG. 13. The plate 100 has depending flanges 112 which are inwardly turned at their lower ends and overlap outwardly extending flanges on the individual clamps 98. It is preferable to provide a resilient cushion of rubber or the like, as shown at 110, between the downwardly facing surface of the pressure plate and the wire clamps 98.

Figure 4:
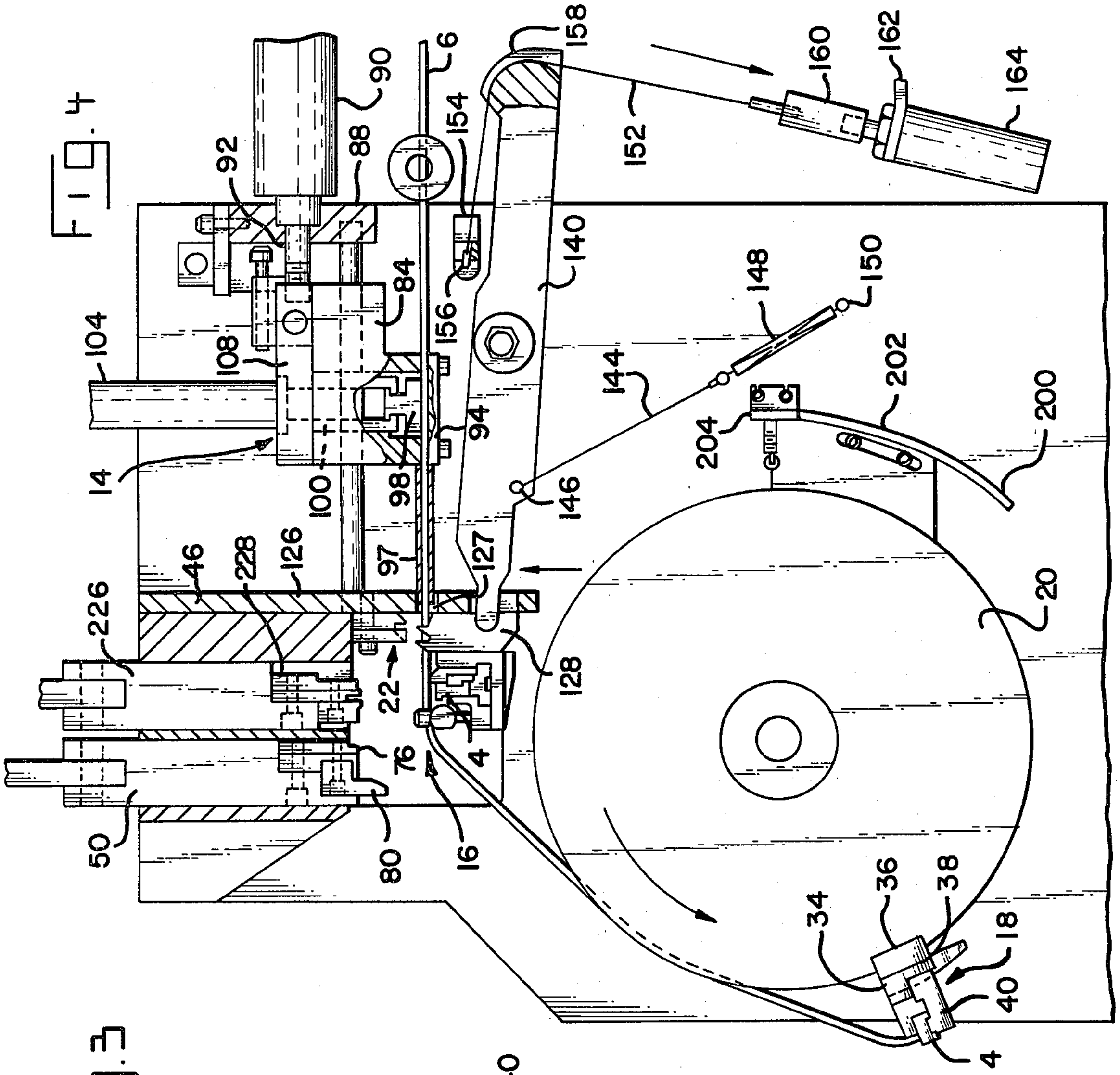
FIGS. 3, 4, 5 and 6 are views similar to FIG. 2 but showing the positions of the parts at different stages of the operating cycle and illustrating different modes of operation for producing different types of harness subassemblies.
Figure 3:
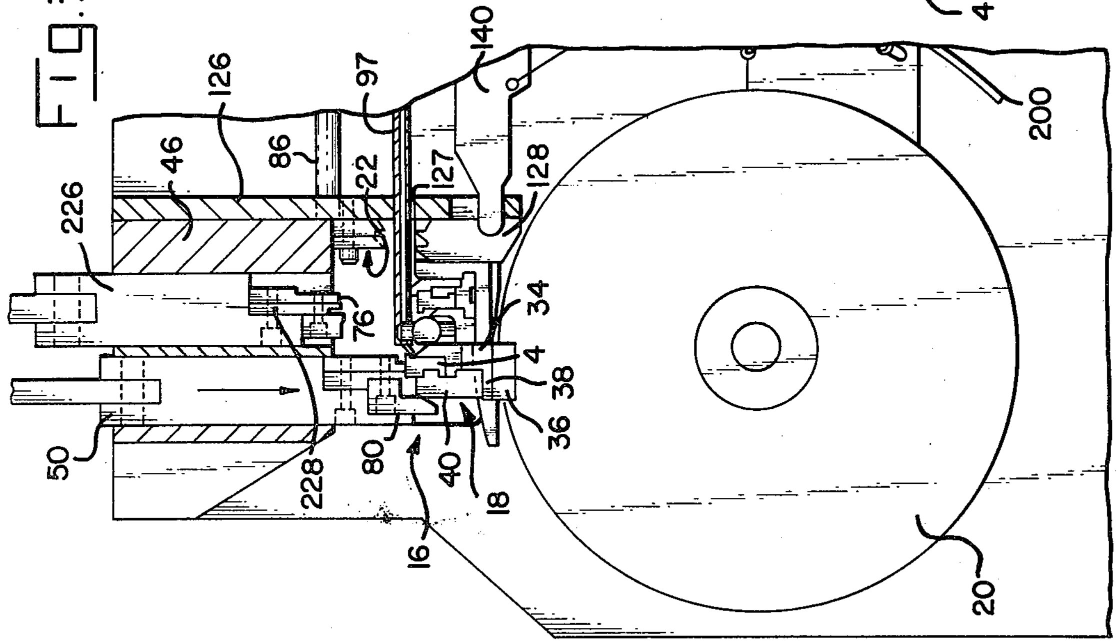
Figures 5, 6:
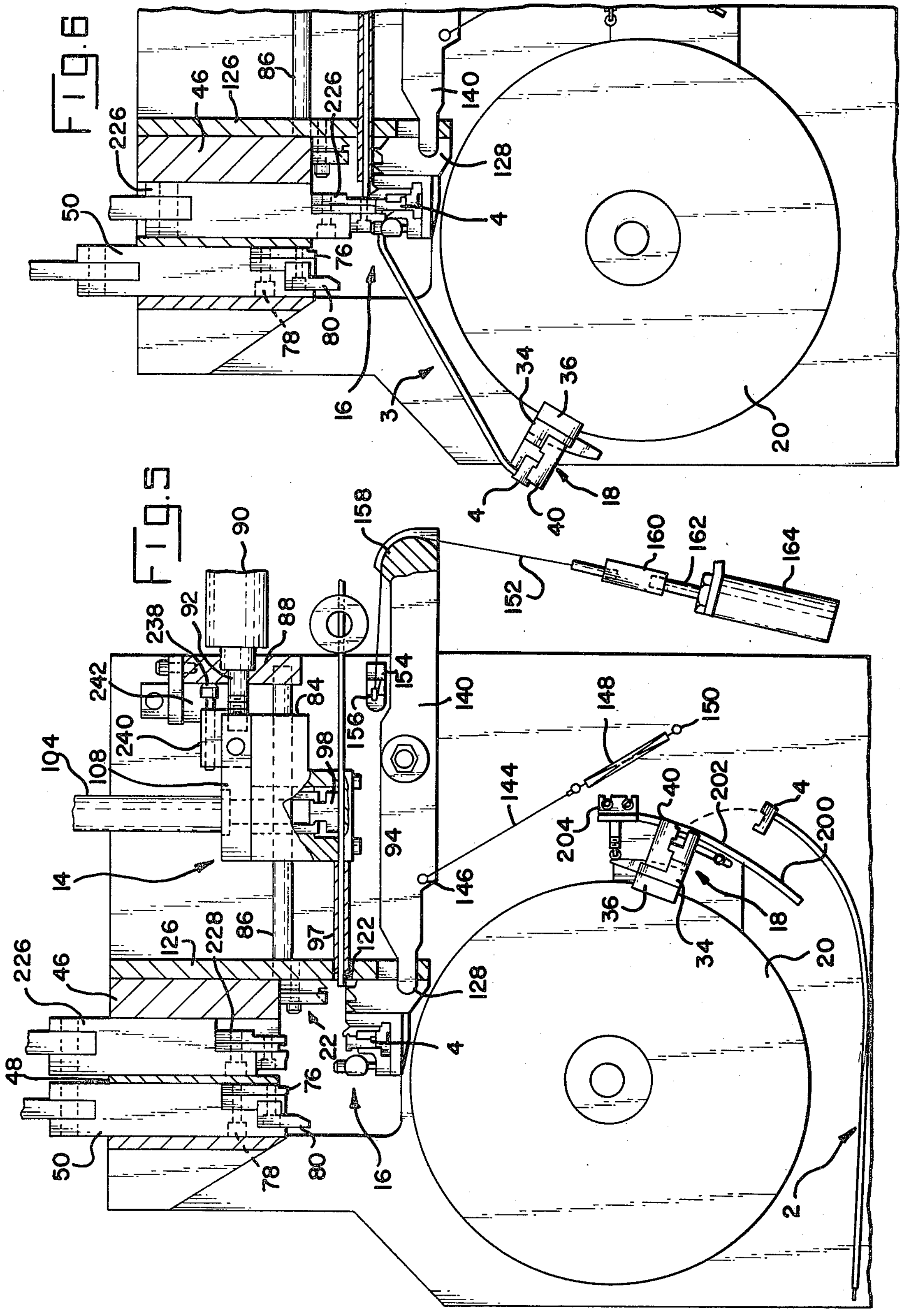

At the beginning of an operating cycle of the apparatus, the parts will be substantially in the positions of FIG. 2, except that the leading ends of the wires will extend only to the opening 127 in the plate 126. The cylinders 90, and 104 are first pressurized to clamp the wires against the plate 94 of the slide 84 and advance the slide 84 into the insertion zone. The slide dwells in the insertion zone, wires are unclamped and the cylinder 66 is then pressurized to drive the ram 50 downwardly thereby to insert the wires into the terminals in the connector. It should be mentioned that the leading end 118 of the plate 94 on the slide, overlaps the connector in the insertion station by a slight amount so that during subsequent upward movement of the ram, the connector will not be pulled upwardly but will be retained in the connector locating means on the wheel 20. The wheel is then rotated, as shown in FIGS. 4 and 5, the cutting blades are actuated, wire is drawn from the spools and the finished harness subassembly is ejected as shown in FIG. 5. The slide retracts to the position of FIG. 5 and the wheel returns to its normal position and the next cycle can then be initiated. The cutting means and the programming means for this cutting means are described below.

The wire cutting means for cutting the wires and cutting the insulation of each wire, are shown best in FIGS. 2–6 and 7. Each wire cutting means comprises fixed upper cutters 120, 122, which cut the wire and the insulation of each wire respectively, and two lower or movable cutters 130, 132. The upper cutters are secured to the plate 126 by suitable fasteners, as shown at 124 and the lower cutters for each wire are integral with an individual plate 128. These plates are slideably contained between the leftwardly facing surface of the frame plate 126 and the surface 136 of an L-shaped block 134, which is also secured to the frame plates of the apparatus. The plates 128 and, therefore, the cutters 130, 132 can be individually moved upwardly by means of levers 140 having reduced lefthand ends 138, which are received in recesses in the plates 128.

Each lever 140 is pivotally mounted on a pivot axis, as shown at 142, and is biased in a counter-clockwise direction, as viewed in FIG. 2, by a cable 144 secured to a pin 146 on the lever and secured also to a spring 148, which is anchored on a rod 150 which extends between the frame plates 28, 30.

It will be apparent from FIG. 2, that when one of the levers 140 is swung through a slight clockwise arc, the lefthand end of this lever will move upwardly thereby moving the associated plate, having cutters 130, 132 thereon, upwardly and cut the associated wire 6. The levers are selectively moved upwardly by means of a cable 152 associated with each lever. Each cable is secured, as shown at 156, to a bar 154 which extends between the frame plates 28 and 30 and each cable extends across an arcuate surface 158 on the righthand end of its associated lever. From this surface each cable 152 extends to a coupling 160 on the end of a piston rod 162 of an associated piston cylinder 164. Each lever and, therefore, each movable cutter 128 has one of the piston cylinders 164 associated therewith, these piston cylinders being mounted as a cluster 165 on the base plate 24, as shown best in FIG. 1.

Figure 11:
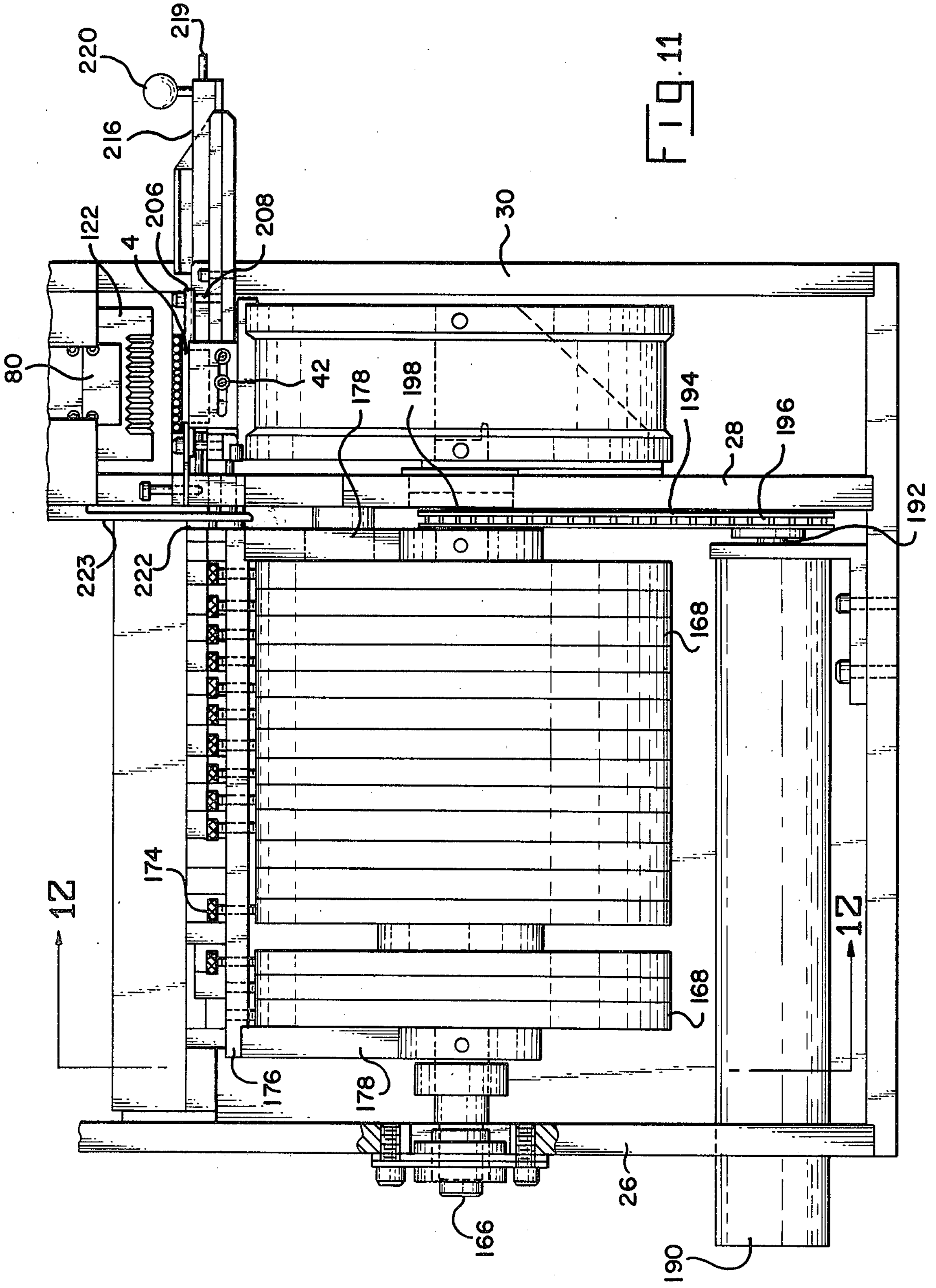
FIG. 11 is a frontal view of the lower portion of the apparatus showing a bank of cams which function to determine the lengths of the wires extending from the terminals in a harness assembly.
Figure 12:
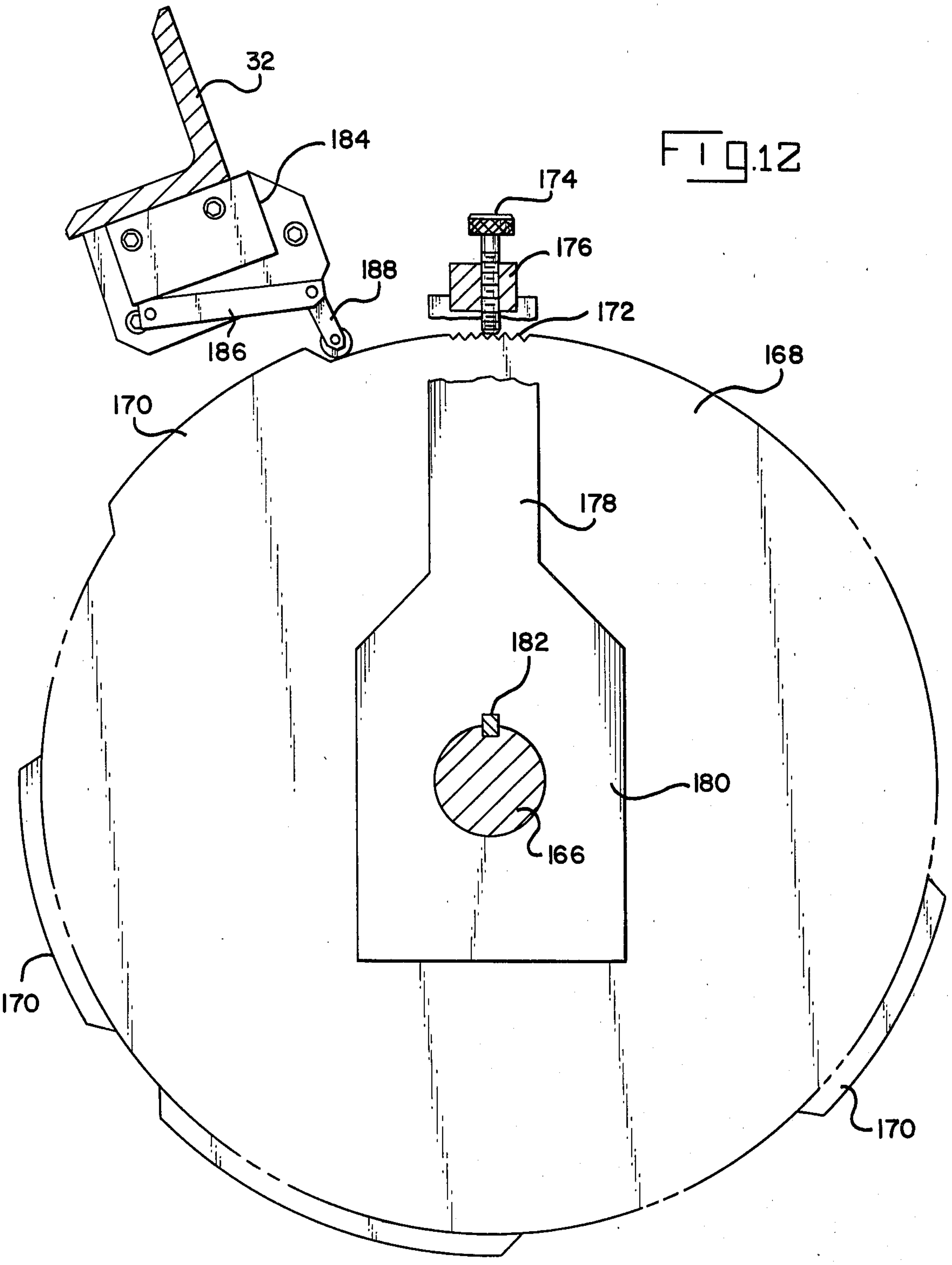
FIG. 12 is a view taken along the lines 12—12 of FIG. 11.
Figure 16:
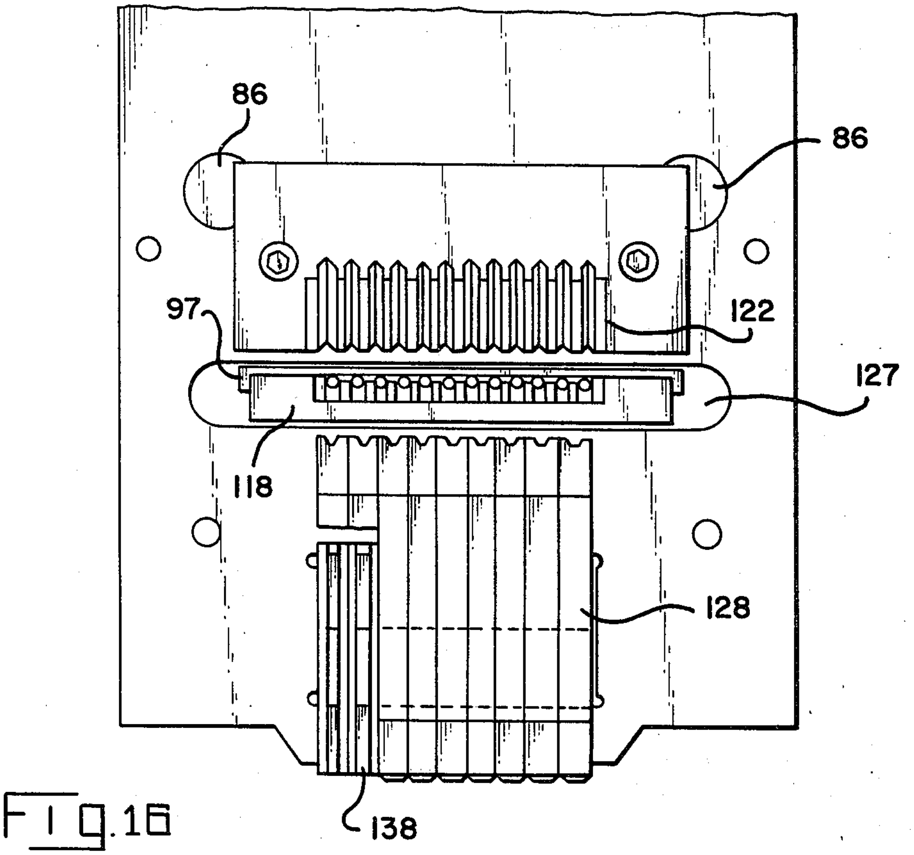
FIG. 16 is a view taken with lines 16—16 of FIG. 7 showing details of the wire cutting means.

It will be apparent from the foregoing, that in order to achieve the variable wire lengths, as shown at 6, in the harness assembly of FIG. 18, it is necessary to pressurize the cylinders 164 after the elapse of predetermined intervals following the commencement of movement of the connector from the insertion zone. Accordingly, a programmable system is provided and pressurizing each cylinder at the appropriate time which will produce the desired wire lengths. This control means, as shown in FIGS. 11 and 12, comprises a plurality of cams 168 which are freely mounted on a shaft 166 which extends between, and journaled in, the frame plates 26, 28. Each cam 168 has a lobe 170 on its periphery with the remainder of the periphery being serrated, as shown at 172. The individual cams 168 can be locked in any desired position of adjustment to a support bar or clamping bar 176 which extends parallel to the shaft 166 and which is spaced from the peripheries of the cams. As shown in FIG. 12, locking is achieved by means of a set screw 174 for each cam, which can be tightened against the serrated periphery of the cam. The bar 176 has arms 178 on its ends which extend radially towards the shaft 166 and the ends of these arms 180 are keyed, as shown at 182, to the shaft 166.

The previously identified wheel 20 is also mounted on the shaft 166 so that when this shaft is rotated, the arms 178, the bar 176, and the cams 168 will also be rotated as a unit. The lobes 170 of the individual cams will therefore be moved past the pivoted arms 188 of switches 184 that are mounted on the bracket 32. Each switch has two pivotal arms 186 and the arm 188, and the arrangement is such that when the cam 168 moves in a clockwise direction from the position of FIG. 12, the arm 186 will be swung upwardly towards the switch and thereby change the condition of the switch while reverse movement of the cam past the arm 188 will not affect the arm 186.

It will be apparent from the foregoing, that the length of the individual wires 6 in the harness assembly 2 can be determined by simply loosening all of the set screws 174, rotating the cams 168 relative to the shaft 166, to the positions which will produce the desired wire lengths, and then tightening the set screws. During the operating cycle then, movement of the cams 170 past the switches will cause the conditions of the switches 184 to be changed, thereby causing selective pressurization of the piston cylinders 164 and selective actuation of the movable cutters.

The shaft 166 may be oscillated during each operating cycle by any suitable actuating means, such as an electric motor with a mechanical coupling having a reversing mechanism and clutch therein. It is preferred, however, to use a rotary pneumatic acutator, as shown at 190, FIG. 11, having an output shaft 192 on the end of which there is a sprocket 196. Sprocket 196 is coupled by a chain 194 to a sprocket 198 on the shaft 166. The actuator 190 may be of the known types described, for example, in U.S. Pat. Nos. 2,936,737 and 2,974,646. Actuators of this type are available from Carter Controls Inc., of Lansing, Illinois, and are described in the Carter Bulletin RA-500 E. As will be explained in more detail below, an apparatus in accordance with the invention can be designed to use only compressed air and does not require electrical switches at any of the locations where switches are required.

When the wheel rotates in a counter-clockwise direction to the limit of its travel (FIG. 5), the completed harness assembly 2 is automatically ejected by an ejector 200, FIG. 2, in the form of a plate which extends normally from the surface of frame plate 28 and which is adjustably secured to the frame plate by a mounting plate 201 through which suitable fastening bolts extend. The upper edge 202 of the plate 200 functions as a cam surface and rises to an increasing extent above the surface of frame plate 28 along its length to a switch means 204. The edge 202 engages the connector 4 in the locating means 18 and pushes it from the connector locating means. Thereafter, the condition of the switch means 204 is changed and the air supply to the rotary actuator 190 is controlled in a manner to cause reversal of the actuator and return movement of the wheel 20 in a clockwise direction.

It is desirable to provide a guide roller 206 in the operating zone which extends transversely across the operating zone and adjacent to the previously identified L-shaped plate 34. This guide roller is slideably mounted on pins 208 having caps 209 and is upwardly biased towards these caps 209 by springs 207, FIG. 17, mounted in the block 134. This guide roller serves to guide the wires and maintain them in their spaced apart condition during movement of the connector away from the insertion zone and also cooperates with a wire clamping member 234 when the apparatus is operated in an alternative mode.

Figure 8:
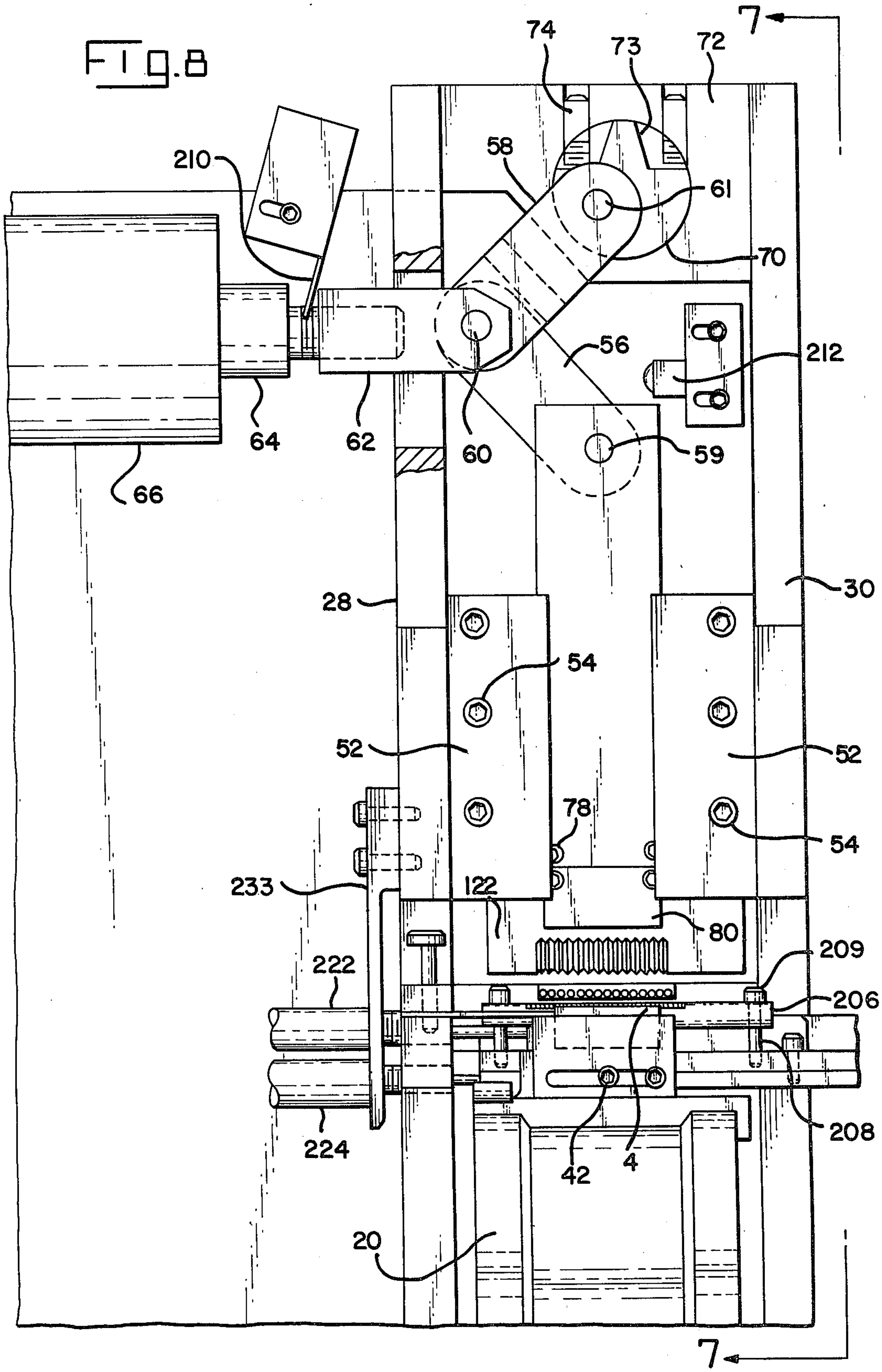
FIG. 8 is a view taken along the lines 8—8 of FIG. 7 and is a frontal view of the apparatus looking towards the insertion zone.
Figure 9:
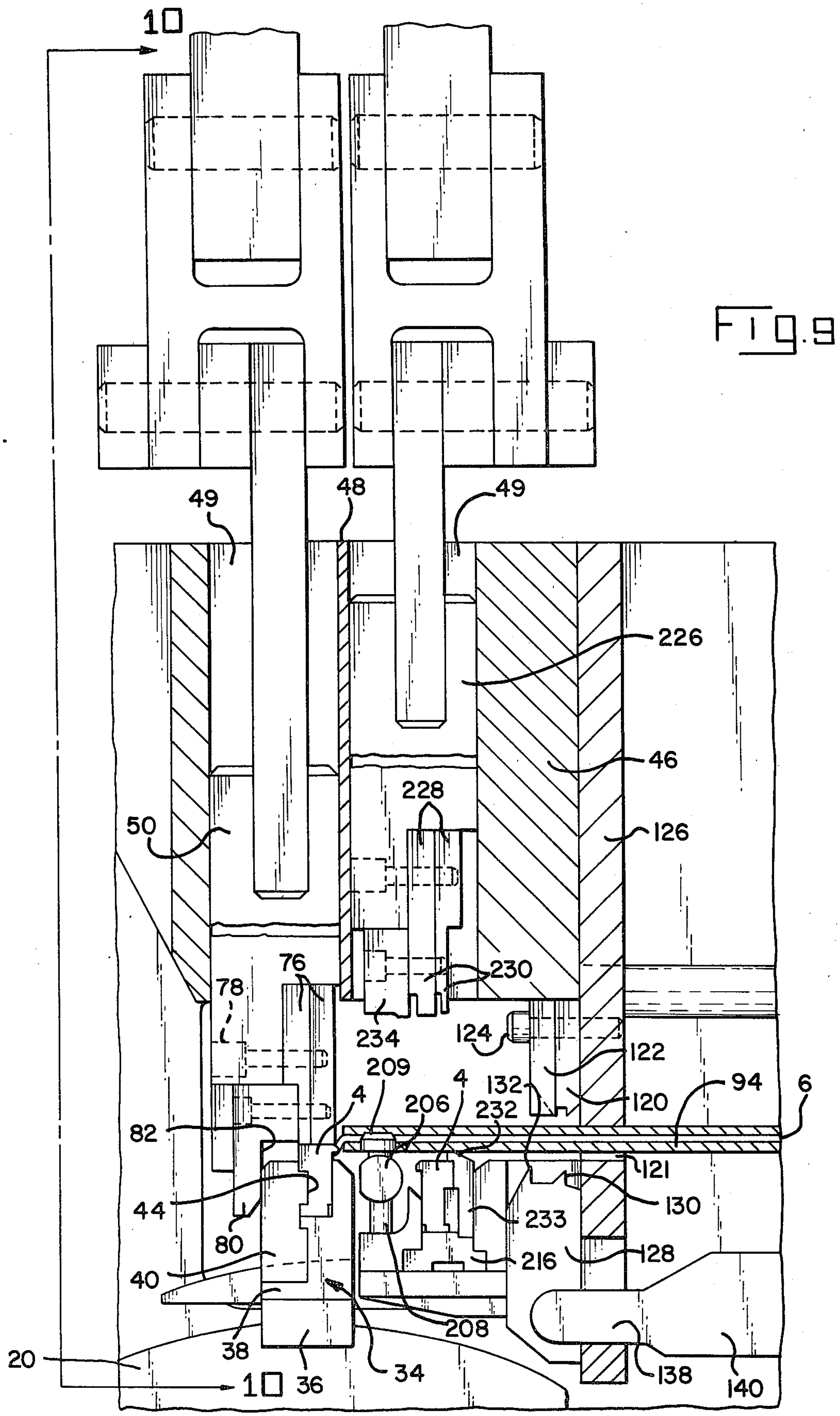
FIG. 9 is a view similar to FIG. 7 showing the positions of the parts at the instant of insertion of the wires into a first connector in the insertion zone.

Control of compressed air to the piston cylinder 66 and to the piston cylinders 92 and 104 may be controlled by suitable pneumatic switches 210 and 212, as shown at FIG. 8. The switch 210 is affected by the yoke 62 when it is moved to its retracted position and when the yoke is moved rightwardly, the position of this switch is changed. The switch 212 is engaged by the toggle knee joint when the ram reaches its lowermost position, as shown in FIG. 10. Suitable pneumatic circuitry is, of course, provided to control the flow of compressed air to the piston cylinders when these switches are engaged by the moving parts of the apparatus.

The harness 3, FIG. 19, has a connector 4 on each end thereof and wires 6 extend between corresponding terminals in the two connectors. Harnesses of this type are produced by applying the second connector 4 after the first connector has been moved away from the insertion zone and the parts are in the positions of FIG. 4. After the parts have reached these positions and the required lengths of wire have been withdrawn from the reels, the wheel 20 is stopped and the second connector 4 is applied to the wires by means of a second set of insertion tools, which will now be described.

Figure 17:
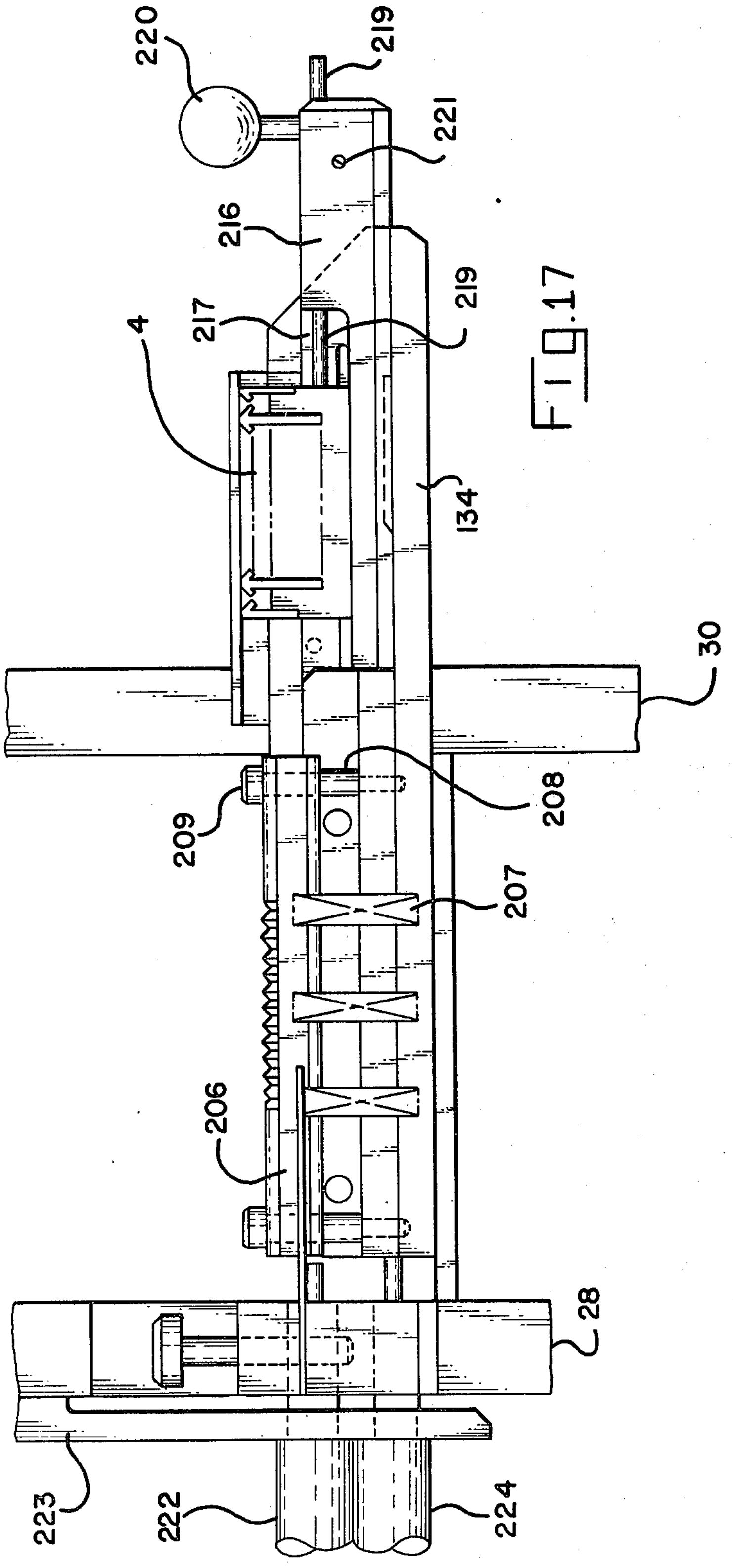
FIG. 17 is a view taken along the lines 17—17 of FIG. 7 showing details of the connector for locating the second connector in the harness.

The second connector 4 is supported in a slide 216, FIG. 17, which is supported on the previously identified L-shaped block 134 and which is retained on the block on a suitable gib. The slide 216 has a recess 217 on one side thereof and a positioning rod 219 extends into the slide and into the recess. This positioning rod can be adjustably located by a suitable retaining means 221 in a desired position of adjustment for different sizes of connectors. The connector 4 is located with its one end against the end of the rod 219 and the slide is thereafter moved inwardly, or leftwardly, by means of a handle 220 thereon, from the position of FIG. 17. When the slide is moved inwardly, the connector is further positioned by means of an air cylinder 222 mounted on a bracket 223 on a frame plate 28, see FIG. 8. The piston rod of this air cylinder imposes a light pressure upon the lefthand end of the connector so that the terminals in the connector will be in proper alignment with the insertion punches 228, shown in FIG. 7. These punches are secured on the lower end of the ram 226 by suitable fasteners as shown, and one of the punches is provided with a shearing edge 230 which cooperates with a fixed shearing edge 232 on a shear bar 233 mounted in the L-shaped bracket 134. A clamping bar 234 for clamping the wires is also provided on the ram 226 and cooperates with the previously identified roller 206, as best shown in FIG. 6. It will thus be apparent that upon downwardly movement of the ram 226 to the position of FIG. 6, the wires will be cut by the fixed and movable shears 230, 232 and will be inserted by the inserters 228 into the terminals in the second connector which is positioned in the slide 216. The second connector is released after the ram moves upwardly to the position of FIG. 7 by a second piston cylinder 224 which is also mounted on the bracket 223, see FIG. 8. The piston rod of this piston cylinder returns the slide to its outer position, FIG. 11, so that the second connector can be removed from the slide and the completed harness removed from the apparatus. The wheel 20 is rotated after insertion of the wires into the second connector so that the second connector can be removed by the ejecting means 200, 202.

The block 84 is stopped during its return stroke to the position on FIG. 2 by the plate 88 which extends between the frame plates 28, 30, as shown in FIG. 14. The block 84 has a mounting block 240 thereon into which is threaded a suitable screw 238. Thus, when the reciprocable block 84 is retracted, this stop screw abuts the plate 88. Slide member 244 is normally biased by springs 254 to a position such that the stop block 242 is effective to prevent return movement of the slide block 84 beyond the position of FIG. 15. A piston cylinder 250 is mounted on the upper side of the slide 244 and the piston rod 252 of this piston cylinder bears against the plate 30. Thus, if it is desired to operate the apparatus in a mode to produce harnesses as shown at 2, the piston cylinder 250 is pressurized, thereby driving the slide 244 towards the plate 28, in other words, to the position of FIG. 14. In this position, the stop block 242 is moved towards the plate 28 and the feed block 84 is permitted to move to its fully retracted position of FIG. 14. Thus, the piston cylinder 250 is maintained in a pressurized condition whenever harnesses, as shown at 2, are produced and if harnesses, as shown at 3 are being produced, the pressure is released from the piston cylinder 250. The slide 244 may be guided on the plate 88 by pins 248 which extend through an elongated slot 246 in the slide.

It will be apparent that the production of harnesses as shown at 5, FIG. 20, involves the use of both the insertion stations. The third connector 4, in FIG. 10 at the extreme right, being applied to the wires at the second insertion station. After this third connector has been installed on the wires, the apparatus is operated in the mode described above to produce wires of uneven lengths 6 extending from the third connector 4. Harnesses and harness subassemblies having some of the features of the harnesses 3 and 5 can also be produced. For example, a harness of the type shown in FIG. 3, having additional connectors on the wires between the two end connectors, can also be produced by stopping the wheel and placing a connector in the second insertion station for each connector required.

As previously mentioned, the entire control and actuating system for the apparatus can be pneumatic rather than electric, or electric-pneumatic, if desired. Pneumatic logic controls and pneumatic control valves of types commonly known can be used for the system. Suitable logic control valves, for example, to control the sequential operation of the air cylinders of the apparatus may be of the type produced by Clippard Instrument Laboratories Incorporated of 7390 Colerein Road, Cincinnati, Ohio. The totally pneumatic actuation system will also have suitable selector valves for selecting the different operating modes described above. The apparatus can be cycled either manually or automatically as desired, and again, suitable actuating valves can be provided to achieve either method.

What is claimed is:

1. Apparatus for serially manufacturing electrical harness means of the type comprising at least one electrical connector, said connector having contact terminals therein of the type having wire-receiving portions, said harness means having wires connected to, and extending from, said terminals, said apparatus being of the type comprising a wire insertion zone, connector locating means for locating a connector in a predetermined position in said insertion zone, wire feeding means for feeding wires in side-by-side parallel relationship from endless wire sources, such as spools, along a first path to position said wires in alignment with terminals in a connector in said connector locating means, and wire insertion means movable along a second path towards and away from said connector in said locating means, the improvements to said apparatus comprising:

connector moving means for moving said connector from said connector locating means along a continuation of said first path away from said insertion zone, first wire-cutting means on said first path, said first wirecutting means being located between said connector-locating means and said first wire sources, said first wire-cutting means comprising individual sets of cutters for each of said wires, and actuating means effective to actuate said feeding means thereby to feed the leading ends of said wires to said insertion zone, to thereafter actuate said wire insertion means to insert said leading ends of said wires into said terminal of said connector in said connector-locating means, to thereafter actuate said connector moving means to move said connector from said insertion zone and thereby withdraw wire from said wire sources, and said actuating means being effective selectively to actuate said individual wire cutters during movement of said connector to produce wires of predetermined lengths extending from said connector.

2. Apparatus as set forth in claim 1, said actuating means having program control means for cutting said wires at predetermined intervals after the beginning of movement of said connector from said connector locating means whereby said harness means will have wires of varying lengths extending from said terminals.

3. Apparatus as set forth in either of claims 1 or 2, each of said individual sets of cutters of said first wire-cutting means comprising insulation cutting blades for cutting only insulation on said wires and wire-cutting blades for cutting entirely through said wires, said insulation cutting blades being spaced from said wire-cutting blades whereby insulation will be stripped from the ends of said wires of said harness means.

4. Apparatus as set forth in claim 3, said connector moving means comprising a wheel, said connector locating means being secured to said wheel, said wheel being rotatable under the influence of said actuating means.

5. Apparatus as set forth in claim 4, said wire feeding means comprising a wire feed shuttle, said wire extending from said sources through said shuttle, releasable clamping means on said shuttle for clamping said wires to said shuttle, said shuttle being movable between a retracted position, in which said shuttle is spaced from said wire insertion zone, and a forward position, in which said shuttle is proximate to said wire inserting zone, said actuating means being effective to engage said clamping means with said wires during movement of said shuttle to said forward position and being effective to disengage said clamping means from said wires during movement of said wires to said retracted position whereby said wires are pulled from said sources during said forward stroke and the leading ends of said wires are delivered to said insertion zone.

6. Apparatus as set forth in claim 1, said apparatus having a second connector locating means and a second wire insertion means in said insertion zone, said second connector locating means being beside, and extending parallel to, said connector locating means and being upstream, relative to the direction of wire feed, from said connector locating means, and second wire cutting means associated with said second connector locating means and said second connector locating means for cutting wires inserted into a connector located in said second connector locating means whereby said apparatus is capable of manufacturing harness means having two connectors and wires connected to, and extending between the terminals in said connectors.

7. Apparatus as set forth in claim 1, said connector locating means being mounted on a rotatable supporting wheel, said connector moving means comprising means for rotating said wheel.

8. Apparatus as set forth in claim 7, said actuating means having program control means for cutting said wires at predetermined intervals after the beginning of rotation of said supporting wheel.

9. Apparatus as set forth in claim 8, said supporting wheel being mounted on a shaft, said program control means comprising cam means on said shaft, said cam means being effective selectively to actuate said individual sets of cutters.

10. A method of serially manufacturing electrical harness means of the type comprising at least one electrical connector, said connector having contact terminals therein of the type having wire-receiving portions, and harness means having wires connected to, and extending from, said terminals, said wires having free ends which are remote from said connector, said method comprising the steps of:

(a) locating one of said connectors in a wire insertion station, (b) positioning the leading ends of wires which extend from substantially endless wire sources, such as spools, in alignment with the terminals in a said connector at said insertion station and inserting said leading ends into said terminals, (c) moving said connector along a predetermined path away from said insertion station and away from said wire sources and thereby pulling wire from said wire sources, (d) cutting said wires during movement of said connector along said path at a fixed location between said insertion station and said wire sources and thereby producing one of said harness assemblies, (e) repetitively carrying out steps (a) to (d) as set forth above to produce said harness means serially.

11. A method as set forth in claim 10 in which said wires are cut individually and at predetermined varying time intervals after the beginning of movement of said connector along said predetermined path whereby said harness means has wires of varying lengths extending from said terminals.

12. A method as set forth in either claim 10 or 11 in which the insulation of each wire is circumferentially cut at a location downstream, relative to the direction of wire movement, from said fixed location whereby said free ends of said wires have insulation stripped therefrom.

13. A method as set forth in claim 12 including the steps of stopping movement of said connector along said predetermined path prior to cutting of said wires, locating a second connector in said insertion station, inserting said wires into said terminals in said second connector, thereafter moving said second connector and said connector along said path and then cutting said wires whereby said harness means comprises two spaced-apart connectors and said wires extend from said second connector to said free ends.

* * * * *